Sept. 18, 1962  D. J. HALEY  3,054,625
VEHICLE AXLE AND SUSPENSION ASSEMBLY
Filed Oct. 30, 1959
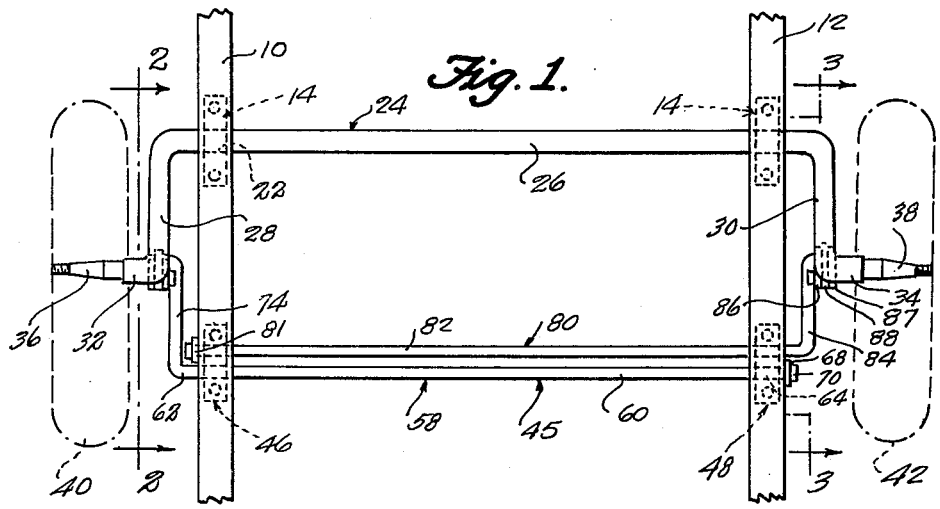
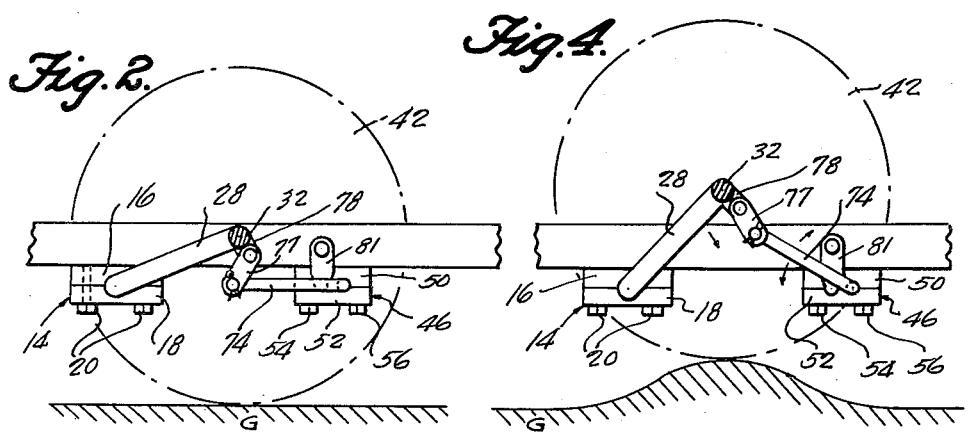
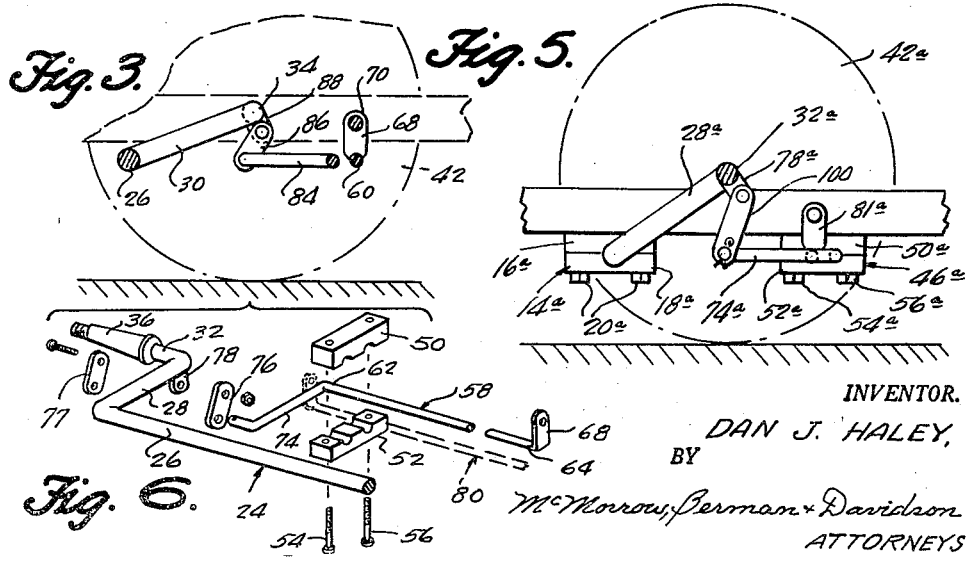
INVENTOR.
DAN J. HALEY,
BY
McMorrow, Berman & Davidson
ATTORNEYS

United States Patent Office 3,054,625
Patented Sept. 18, 1962

3,054,625
VEHICLE AXLE AND SUSPENSION ASSEMBLY
Dan J. Haley, Wichita, Kans., assignor to Da-Mar Industries, Inc., Wichita, Kans., a corporation of Kansas
Filed Oct. 30, 1959, Ser. No. 849,848
2 Claims. (Cl. 280—124)

The present invention pertains generally to an improvement in vehicle suspension, and more specifically, to an axle assembly for a trailer or the like of the type known in this art as a "level load" system, the present construction employing torsion-type suspension means in combination with an axle so constructed as to coact with the suspension means in achieving the desired "level load" characteristic.

Among the primary objects of the present invention is the provision of an improved axle assembly in combination with a torsion-type suspension means, the combination being of such construction that the wheels located at the outer ends of the axle are mounted for joint vertical movement when either of the wheels encounters an obstruction, thereby eliminating any sidewise tilting of the vehicle frame and imparting a level ride characteristic to the vehicle. Further, this improvement provides for the carrying out of this objective without limiting the distance from the vehicle floor to the ground between the wheels of the vehicle.

Another object is to provide a suspension system for a vehicle axle assembly, the suspension system including a separate suspension element for each wheel, and wherein the forces of encountering an obstruction is distributed equally between the suspension elements at each of the wheels.

Yet another object is to provide interchangeable linkage means between the axle and the suspension means whereby the suspension system is adaptable to adjustment for varying road conditions.

Another object is to provide a suspension system of the class described supra which is characterized by its relative simplicity of construction, and is therefore inexpensive in original fabrication and supplemental maintenance.

Other and further objects and advantages of the instant invention will become more readily apparent from a consideration of the following specification when read in conjunction with the annexed drawing, in which:

FIGURE 1 is a top plan view of a portion of a vehicle frame wherein the suspension system constructed and assembled in accordance with the teachings of the present invention is employed;

FIGURE 2 is a side elevational view, partly in cross section along the section line 2—2 of FIGURE 1, illustrating the elements of the system in a normal operating location;

FIGURE 3 is a detail, cross sectional view taken on section line 3—3 of FIGURE 1, looking in the direction of the arrows;

FIGURE 4 is a view similar to FIGURE 2, the elements to the system being illustrated in their respective locations when one of the wheels has encountered an obstruction;

FIGURE 5 is a view similar to FIGURE 4, but illustrating a modified construction in which longer connecting links have been illustrated for those shown in the first form; and FIGURE 6 is a fragmentary, exploded perspective view of certain of the structural elements of the combination.

As set forth above, one of the principal objectives of the invention is the provision of a vehicle suspension system wherein the body portion of the vehicle is maintained in a level position with respect to the plane of the terrain over which it is operated at all times, and one wherein both of the wheels are moved jointly in a generally vertical direction relative to the aforesaid plane whenever either wheel encounters an obstruction. Accordingly, in FIGURES 1 to 4, the present invention has been illustrated herein in one embodiment adapted for use as applied to a trailer body.

Proceeding now to a more detailed description of the invention, reference numerals 10 and 12 designate a pair of longitudinally extending side frame elements of a trailer (not shown), or other vehicle. A pair of axle bearing assemblies 14 are secured to the undersides of each of the frame members 10 and 12, and each comprises a pair of mating bearing blocks 16 and 18. The plates 16 and 18 are provided with vertical bores which are co-aligned to receive connecting bolts 20 and have transverse, semicircular depressions formed in their facing surfaces which, when the plates are placed together, form a journal 22. It will be understood that this bearing structure is merely one that can be advantageously used. Other types of bearings may be employed, without departure from the spirit of the invention as hereinafter claimed.

A carry-through axle utilized in this invention is generally identified by reference numeral 24 and includes an elongated substantially cylindrical main body portion 26 having integrally formed cranked extensions 28, 30 at its outer ends. The extensions 28, 30 project generally radially from the main body portion 26 and have outwardly projecting stub axles 32, 34 at their distal ends. The stub axles 32 and 34 have a common major axis which is substantially parallel to the major axis of the main body portion 26. Spindle means 36, 38, respectively, are provided on the outer ends of the stub axles and ground wheels 40, 42 are rotatably mounted thereon.

As shown in the drawing, the main body portion 26 of the axle 24 is carried in the journals 22 of the bearing assemblies 14, and the axle is freely rotatable therein, the spindles 36, 38 thus being movable in an arcuate path about the major axis of the main body portion 26, as will appear in more detail below.

Suspension means for the axle 24, and springing for the same, is provided by a torsion bar suspension assembly 45. The assembly includes bearing block structures 46 and 48 of identical construction and assembly. The bearing block structures 46 and 48 each includes a top bearing block 50, bottom block 52, and connecting bolts 54, 56 for the connection thereof to the underside of the frame members 10 and 12 at a predetermined distance from the axle bearing assemblies.

A first torsion bar 58 is provided and includes an elongated main bar element 60 having ends 62 and 64. The end 64 of the torsion bar 58 passes through the bearing block structure 48 and extends a short length outwardly on the outer side thereof where it is formed with an upwardly projecting locking extension 68 secured to the frame member 12 by bolt or pin means 70. This fixedly engages the end 64 against rotation. The end 62 of the torsion bar 58 is rotatably received in the bearing structure 46 and an integral crank arm 74 extends perpendicularly therefrom. Adjacent the outer end of the arm 74 there is provided a link connection comprising link elements 76, 77 which are pivotally pinned thereto. The links 76, 77 have their opposing ends pivotally connected to the stub axle 32 by means of securing the same to an ear 78 which is integrally formed thereon.

A second torsion bar 80 is similar in construction and assembly with the first torsion bar 58, but is oppositely mounted with its fixed connection being adjacent the bearing structure 46. A main body element 82 passes rotatably through the bearing structure 48. A crank arm 84, locking extension 81, links 86, 87 and ear 88, complete this torsion assembly.

The operation of the present invention is best seen in FIGURES 2 and 4 wherein ground level is designated by the letter G. Normal operating position is seen in FIGURE 2, while FIGURE 4 shows the location of the elements when an obstruction is encountered. As seen in the last-named figure, in which wheel 42 has encountered the obstruction, the upward movement of the wheel 42 causes the extension 30 to swing upwardly. The links connected to said extension are thus pulled in an upward direction, thereby exerting an upward pull on the crank arm 84. This stresses the torsion bar 80, which rotates in the bearing provided therefor on the frame member 12. Torque is thus produced in the body portion 82 over its full length, since the other end thereof is anchored to the frame member 10.

Simultaneously, the rotation of the axle 24, resulting from the elevation of the wheel 42, will produce an upward movement of the extension 28 and wheel 40 corresponding to the elevation of the extension 30 and the wheel 42, respectively.

This elevation of the extension 28 will produce upward movement of the crank arm 74 through the medium of the associated connecting links. This will produce rotation of the body portion 60 of the torsion bar 58 in the bearing of the frame member 10. Torque is thus induced in this bar over its full length, due to its being anchored to the frame member 12.

This arrangement, I have found, provides a highly desirable, balanced springing of a level load type of wheel suspension. This results from the use of torsion bars, one stressed by elevation of one end of the carry-through axle and the other stressed by the elevation of the other end of said axle, in a relationship of parts such that both bars are oppositely arranged in positions extending between the frame members parallel to and spaced from the axle.

In accordance with the foregoing, it is clearly seen that the spring and suspension action occasioned by the present construction provides for a completely level movement of the vehicle, so long as the displacement of the wheels caused by obstructions encountered are within the range defined by the maximum rotational limit of the crank arms of the axle assembly with respect to the torsion assembly. The FIGURE 4 drawing illustrates near maximum operation for the device when it is provided with the links 76 of a first given length.

In view of varying road conditions, it has been found advisable to supply links of different lengths, thereby to increase the functional range of operation of the device. An embodiment employing this concept is seen in FIGURE 5, wherein parts corresponding to the numbered elements of the first embodiment employ like reference characters with the addition of a letter "a" thereto. As clearly seen in this figure, the only change resides in the provision of relatively elongated links 100. It is contemplated, as a functional advantage of the present invention, that a supply of links of varying sizes may be provided and the links interchanged in accordance with conditions dictated by the terrain in which the vehicle is operated.

Having described and illustrated two embodiments of this invention in detail, it is to be understood that these embodiments have been offered by way of illustration only, and that the scope of the invention is to be limited only by the appended claims.

What is claimed is:

1. In a vehicle axle and suspension assembly for use with a vehicle frame, the vehicle frame including spaced apart, longitudinally extending frame members having inner and outer sides, the combination of:

(a) a unitary, carry-through axle structure extending transversely of the frame members, the axle structure having an elongated main body portion with integral, lateral extensions at its opposite ends arranged in spaced relation on the outer sides of the frame members and terminating in integral, outward spindles;

(b) said axle structure, including the main body portion, the lateral extensions, and the spindles, being integral and rigid with respect to one another, the main body portion being rotatably journaled on the frame members;

(c) linkage connection means on the spindles;

(d) ground wheels mounted on the spindles;

(e) suspension means comprising elongated first and second torsion bars, the torsion bars extending between the frame members;

(f) a crank arm integrally secured to one end of each of the torsion bars, one of the crank arms being arranged outwardly of each of the outer sides of the respective frame members in substantially vertical alignment with the linkage connection means on said spindles, opposite ends of the torsion bars being fixed to the frame members and the first named ends of the torsion bars being rotatably mounted with respect to the frame members; and (g) linkage means interposed between the linkage connection means on the spindles and the respective crank arms.

2. The combination of claim 1 wherein said linkage means comprises:

(a) interchangeable linkage to effectively vary the distance between the crank arms and the spindles.

References Cited in the file of this patent

UNITED STATES PATENTS

| | | |
|---|---|---|
| 2,426,513 | Linn | Aug. 26, 1947 |
| 2,724,589 | Misic | Nov. 22, 1955 |
| 2,728,569 | Schlegel | Dec. 27, 1955 |

FOREIGN PATENTS

| | | |
|---|---|---|
| 1,002,435 | France | Oct. 31, 1951 |